United States Patent
Kaminaga

(10) Patent No.: US 11,802,684 B2
(45) Date of Patent: Oct. 31, 2023

(54) ILLUMINATION APPARATUS

(71) Applicant: KOITO ELECTRIC INDUSTRIES, LTD., Shizuoka (JP)

(72) Inventor: Youmei Kaminaga, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 3 days.

(21) Appl. No.: 17/622,328

(22) PCT Filed: Jun. 8, 2020

(86) PCT No.: PCT/JP2020/022587
§ 371 (c)(1),
(2) Date: Dec. 23, 2021

(87) PCT Pub. No.: WO2020/261966
PCT Pub. Date: Dec. 30, 2020

(65) Prior Publication Data
US 2022/0243905 A1     Aug. 4, 2022

(30) Foreign Application Priority Data
Jun. 27, 2019  (JP) ................. 2019-119416

(51) Int. Cl.
*F21V 23/00* (2015.01)
*F21Y 113/10* (2016.01)
*F21Y 115/10* (2016.01)

(52) U.S. Cl.
CPC ......... *F21V 23/003* (2013.01); *F21Y 2113/10* (2016.08); *F21Y 2115/10* (2016.08)

(58) Field of Classification Search
CPC ................................. F21V 23/003
See application file for complete search history.

(56) References Cited

U.S. PATENT DOCUMENTS 6,550,949 B1 * 4/2003 Bauer ................. B60Q 1/0023
362/800
6,824,294 B2 * 11/2004 Cao ..................... B23K 26/064
433/29

(Continued)

FOREIGN PATENT DOCUMENTS

JP   2007-299590 A   11/2007
JP   2008-135459 A    6/2008

(Continued)

OTHER PUBLICATIONS

International Search Report for PCT application No. PCT/JP2020/022587 issued by Japan Patent Office as ISA dated Jul. 21, 2020.

(Continued)

*Primary Examiner* — Bryon T Gyllstrom
(74) *Attorney, Agent, or Firm* — Kubotera & Associates, LLC

(57) ABSTRACT

It is an illumination apparatus (10) that can achieve special illumination in addition to normal illumination. It includes a main illumination light source (21) of a predetermined luminescent color, a sub illumination light source (22) adjustable to an arbitrary luminescent color, and a control unit (30) that controls lighting of the main illumination light source (21) and the sub illumination light source (22), the main illumination light source (21) and the sub illumination light source (22) are arranged in a state where respective irradiated lights are mixed on the same path, and the control unit (30) can set a high illuminance mode in which, in addition to lighting of the main illumination light source (21) during normal use, the sub illumination light source (22) is lighted in the same luminescent color as the main illumination light source (21).

5 Claims, 3 Drawing Sheets

(56) References Cited

U.S. PATENT DOCUMENTS

| | | | |
|---|---|---|---|
| 7,083,288 B2* | 8/2006 | Yamanaka | G03B 21/2066 353/31 |
| 7,213,940 B1* | 5/2007 | Van De Ven | H05B 45/20 257/89 |
| 7,286,296 B2* | 10/2007 | Chaves | F21S 41/285 257/E33.071 |
| 7,766,518 B2* | 8/2010 | Piepgras | F21V 29/76 362/547 |
| 8,262,251 B2* | 9/2012 | Rains, Jr. | B82Y 30/00 362/231 |
| 2004/0052076 A1* | 3/2004 | Mueller | F21V 23/0442 362/293 |
| 2004/0150991 A1* | 8/2004 | Ouderkirk | H01L 33/46 362/800 |
| 2007/0267983 A1* | 11/2007 | Van De Ven | F21K 9/64 315/312 |
| 2008/0304260 A1* | 12/2008 | Van De Ven | F21K 9/62 362/231 |
| 2009/0161356 A1* | 6/2009 | Negley | F21K 9/233 362/230 |

FOREIGN PATENT DOCUMENTS

| | | | |
|---|---|---|---|
| JP | 2012-086813 A | 5/2012 | |
| JP | 2012-186070 A | 9/2012 | |
| JP | 2014-017058 A | 1/2014 | |
| JP | 2017-027858 A | 2/2017 | |
| JP | 2017-091996 A | 5/2017 | |

OTHER PUBLICATIONS

Notice of Reason of Refusal for JP Patent Application No. 2019-119416 issued by JPO dated dated Feb. 28, 2023.

\* cited by examiner

ILLUMINATION APPARATUS

TECHNICAL FIELD

The present invention relates to an illumination apparatus including a plurality of light sources.

BACKGROUND ART

As conventional illumination apparatuses, for example, LED (light emitting diode) light sources have replaced fluorescence tubes as the mainstream light sources for interior lights installed on the ceiling inside a cabin of a railroad car. For example, refer to Patent Literature 1. In a case of the illumination apparatus using LEDs as the light sources as described above, as described in Patent Literature 1, it is possible to perform dimming (illuminance) control relatively easily compared with fluorescent lights.

Additionally, although it is not an interior light of a railroad car, for example, an illumination apparatus that increases high color rendering property and color reproduction property is known as an illumination apparatus using LEDs as the light sources. For example, refer to Patent Literature 2. In the technology described in Patent Literature 2, the setting of arbitrary color temperature and the setting of color balance are enabled by combining white LEDs and full color LEDs.

CITATION LIST

Patent Literature

Patent Literature 1: Japanese Patent Laid-Open No. 2012-086813
Patent Literature 2: Japanese Patent Laid-Open No. 2008-135459

SUMMARY OF INVENTION

However, in any case, the previously-described illumination apparatus using LEDs as the light sources only performs general illumination during normal use, and was not intended for special illumination that is different from the normal use.

For example, in the technology described in Patent Literature 2, even the color temperature and the color balance can be arbitrarily adjusted during normal use, special illumination control, such as effectively utilizing only limited LEDs to set the LEDs to high illuminance, which is different from that during normal use, or performing temporary illumination in case of emergency such as breakdowns, is not suggested at all.

The present invention has been made by focusing on the problems with the prior art as described above, and an object of the present invention is to provide an illumination apparatus that can achieve special illumination in addition to normal illumination.

In order to achieve the above-described object, in one aspect of the present invention, an illumination apparatus including a plurality of light sources includes a main illumination light source of a predetermined luminescent color, a sub illumination light source adjustable to an arbitrary luminescent color, and a control unit that controls lighting of the main illumination light source and the sub illumination light source, wherein the main illumination light source and the sub illumination light source are arranged in a state where respective irradiated lights are mixed on the same path, and the control unit can set a high illuminance mode in which, in addition to lighting of the main illumination light source during normal use, the sub illumination light source is lighted in the same luminescent color as the main illumination light source.

With the illumination apparatus according to the present invention, it is possible to achieve special illumination in addition to normal illumination.

DETAILED DESCRIPTION OF THE PREFERRED EMBODIMENTS

Hereinafter, an embodiment of the present invention will be described in detail with reference to the drawings. However, the embodiment described hereinafter is an example, and the present invention is not limited to this embodiment. Note that a detailed description of matters that are already well known, an overlapping description for the substantially same configuration, and the like may be omitted as appropriate.

<Configuration of Illumination Apparatus>

Figure 1:
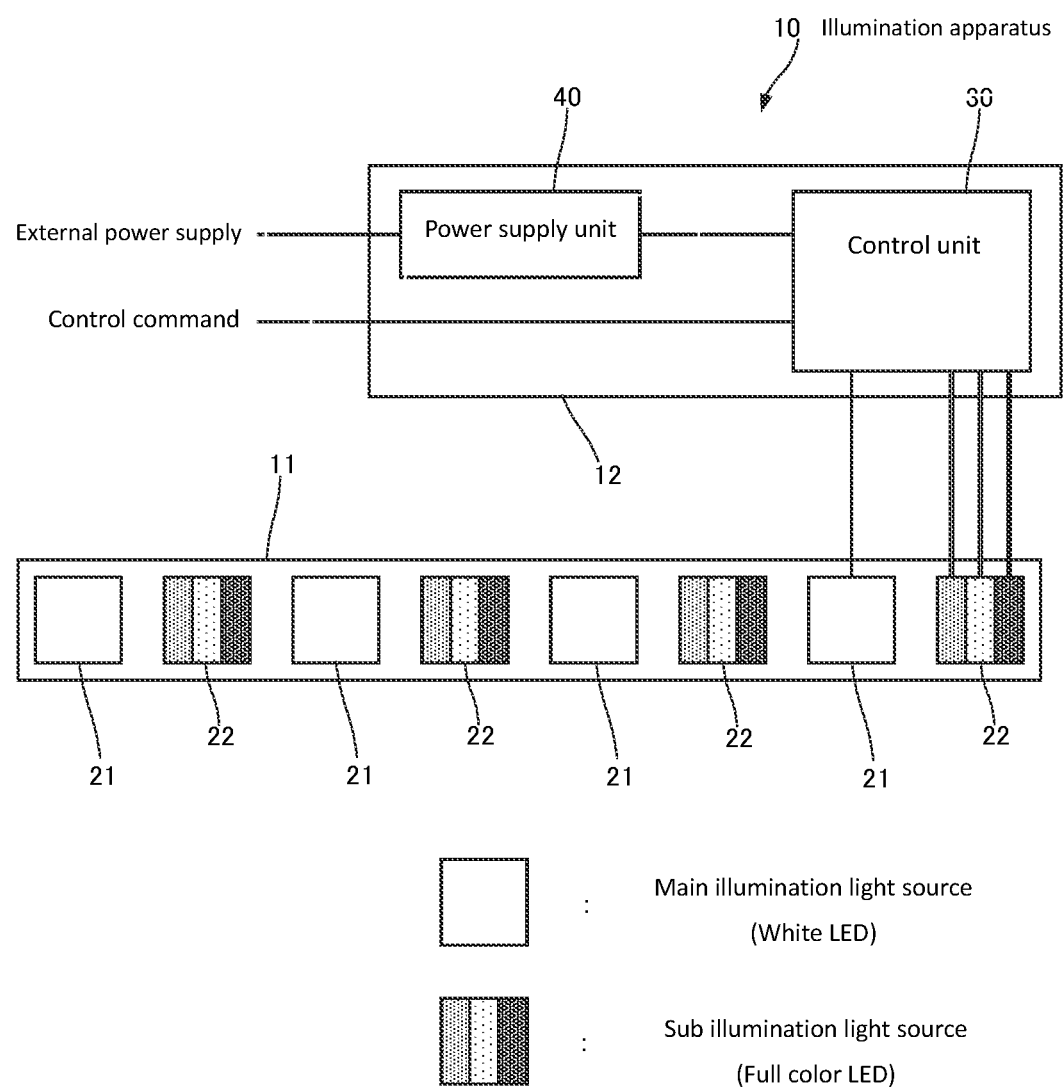
FIG. 1 is a block diagram schematically showing an example of an illumination apparatus according to an embodiment of the present invention.

Referring to FIG. 1, an illumination apparatus 10 according to a present embodiment will be described below in detail. The illumination apparatus 10 according to the present embodiment includes a plurality of light sources. The illumination apparatus 10 is suitable for, for example, an interior light installed on the ceiling inside a cabin of a railroad car, etc. Note that the irradiation form of the light from the illumination apparatus 10 can be direct illumination or indirect illumination.

As shown in FIG. 1, the illumination apparatus 10 includes a main illumination light source 21 of a predetermined luminescent color, a sub illumination light source 22 adjustable to arbitrary luminescent colors, and a control unit 30 that controls lighting of the main illumination light source 21 and the sub illumination light source 22. Note that the relative positional relationship and size of each part shown in FIG. 1 are merely for convenience of description, and are not meant to be accurate.

(Main Illumination Light Source)

The main illumination light source 21 is a light source that can emit light in a predetermined luminescent color, and consists of a white LED that emits light in one color in the present embodiment. The main illumination light source 21 actually consists of a group of a plurality of white LEDs. Although each white LED is basically the same, as long as the luminescent color is a general white type, ones having slightly different color temperatures may be included.

Although, specifically, a white LED emits white light by combining, for example, a blue LED and a phosphor, since its detailed configuration and types are common, a description will be omitted. Note that a general commercial product may be used as the white LED in the present embodiment.
(Sub Illumination Light Source)

The sub illumination light source 22 is a light source adjustable to an arbitrary luminescent color, and consists of a full color LED that emits light in multiple colors in the present embodiment. The sub illumination light source 22 also actually consists of a group of a plurality of full color LEDs. Although each full color LED is basically the same, as long as light can be emitted in multiple colors, ones with a slightly different combination of the same series of colors may be included.

Specifically, the full color LED emits light with various colors and illuminance including white by, for example, additive color mixing of red (R), green (G), and blue (B), and is obtained by combining a red LED element, a green LED element, and a blue LED element into one. The full color LED can be adjusted various colors and illuminance by controlling the feeding current to the LED elements of the respective colors to change the mixing ratio of the light of the three primary colors, red (R), green (G), and blue (B). Note that a general commercial product may also be used for the full color LED.

(Arrangement of Main Illumination Light Source and Sub Illumination Light Source)

The main illumination light source 21 and the sub illumination light source 22 are disposed in the state where the irradiated lights of respective individual LEDs are mixed on the same path. Here, "the state where the irradiated lights . . . are mixed on the same path" means that at least one set of the white LEDs, which form the main illumination light source 21, and one set of the full color LEDs, which form the sub illumination light sources 22, are close to each other in the same irradiation direction, and the respective irradiated lights are mixed so that they overlap each other.

In the present embodiment, the main illumination light sources 21 and the sub illumination light sources 22 are alternately arranged and disposed on the same straight line, respectively. That is, a plurality of white LEDs and a plurality of full color LEDs are mounted at equal intervals so as to be disposed alternately on a substrate 11 linearly extending in a narrow width. The configuration of each LED itself is of a surface-mounted chip type, for example, and each emits light in the irradiation range of a predetermined angle around the optical axis that is perpendicular to a surface of the substrate 11. Additionally, a wiring circuit to which the LEDs are electrically connected are formed on the surface of the substrate 11.

The main illumination light sources 21 and the sub illumination light sources 22 are unitized on the basis of one substrate 11, respectively. In the present embodiment, for example, a total of six LEDs, three white LEDs and three full color LEDs, are mounted as one unit on one substrate 11. Such units may be combined such that a plurality of further units are arranged to be in a row on the same straight line, or are arranged in the width direction as well as the longitudinal direction of the unit, so that the LEDs spread over a surface to be arranged in a matrix.

The individual LEDs are grouped in the unit of an appropriate number for each substrate 11 (unit), and the LEDs in the same group are connected in series with each other, and connected to the control unit 30, which will be described later. In the present embodiment, in each substrate 11 (unit), three white LEDs forming the main illumination light source 21 are connected in series, three full color LEDs forming the sub illumination light source 22 are connected in series, and each group is connected in parallel to the control unit 30. Therefore, when a failure such as disconnection occurs in any LED in each group, it usually becomes impossible to light by group.

Additionally, in the illumination apparatus 10, the substrate 11 including the main illumination light sources 21 and the sub illumination light sources 22 is laid out inside a case body, whose illustration is omitted in FIG. 1, in the state where the light from each LED can irradiate the outside. Further, in addition to the control unit 30, a power supply unit 40 is provided inside or outside the case body. Note that a light-distribution lens, a diffuser, and further, a transparent cover, etc. may be provided in front of the substrate 11, so as to cover the main illumination light sources 21 and the sub illumination light sources 22.

(Control Unit)

The control unit 30 controls lighting of the main illumination light sources 21 and the sub illumination light sources 22. The control unit 30 in the present embodiment is configured by, for example, a microcomputer including, as the main parts, a CPU (central processing unit) that performs the central function for various kinds of control, a ROM that stores programs executed by the CPU and various kinds of fixed data, a RAM for storing data temporarily required when executing the programs, etc.

A control command related to lighting of each of the illumination light sources 21 and 22 is input to the control unit 30 from the outside, and the power supply unit 40 to which electric power is fed from an external power supply, an operation unit for performing other various kinds of input procedures, etc. are connected to the control unit 30, as necessary. Note that the control unit 30 and the power supply unit 40 may be collectively laid out on one control substrate 12.

The ROM of the control unit 30 stores in advance the lighting data related to the lighting of the main illumination light sources 21 and the sub illumination light source 22. Here, "the lighting data" includes, for example, a current value corresponding to the light intensity of the white LEDs, a current value flowing through each color LED element so as to correspond to the luminescent color and light intensity of the full color LEDs, etc.

The CPU of the control unit 30 reads the previously-described lighting data from the ROM in accordance with, for example, various kinds of information, and controls the lighting of each LED of the main illumination light sources 21 and the sub illumination light sources 22 via a driver, whose illustration is omitted. Here, information related to various phenomena, such as the positional information on a vehicle during travelling, the external information such as the surrounding environment and the weather during travelling, the information related to the season, the date, and the time, can be considered to be "various kinds of information". These pieces of information can be input with the previously-described control command from the outside, or alternatively, can be collected from a center, etc. connected to the control unit 30, for example.

In the present embodiment, at least three modes as follows are programmed to be executed by the control unit 30 in any combination. Note that each mode will be described later.

a. A high illuminance mode in which the sub illumination light sources 22 are lighted with the same luminescent color as the main illumination light sources 21, in addition to lighting of the main illumination light sources 21 during normal use b. A backup mode in which the sub illumination light sources 22 are lighted with the same luminescent color as the main illumination light sources 21 at the occurrence of an abnormality in which the main illumination light sources 21 are not lighted c. A dramatization mode in which the sub illumination light sources 22 are lighted in arbitrary luminescent colors according to various kinds of information, in addition to lighting of the main illumination light sources 21

(Power Supply Unit)

The power supply unit 40 is, for example, a rechargeable storage battery, and supplies electric power to the illumination apparatus 10. The power supply unit 40 is configured to feed electric power to the main illumination light sources 21 and the sub illumination light sources 22, and to be charged as well, by being fed with electric power from the external power supply. The electric power from the power supply unit 40 is supplied to each LED of the main illumination light sources 21 and the sub illumination light sources 22 through the driver, whose illustration is omitted, at a current value controlled based on the previously-described lighting patterns.

As for each LED of the main illumination light sources 21 and the sub illumination light sources 22, as mentioned above, for each unit on the basis of the substrate 11, the three white LEDs forming the main illumination light sources 21 are connected in series, and the three full color LEDs forming the sub illumination light sources 22 are connected in series. Therefore, each LED of the main illumination light sources 21 and the sub illumination light sources 22 is configured to be lighted when the same driving current flows through it.

<Effects of Illumination Apparatus>

Next, the effects of the illumination apparatus 10 according to the present embodiment will be described.

With the illumination apparatus 10 according to the present embodiment, the main illumination light sources 21 and the sub illumination light sources 22 are in the state where the irradiated lights of the respective LEDs are mixed on the same path.

Accordingly, the respective lights irradiated from the main illumination light sources 21 and the sub illumination light sources 22 will be emitted to the outside as the light mixed on the same path, and will illuminate the same irradiation area. Therefore, it is possible to adjust the various color temperatures and the illuminance by combining the irradiated lights of the two light sources 21 and 22.

In the illumination apparatus 10, any of each lighting data stored in advance is selected as needed by the control unit 30, and each LED is controlled to be lighted based on the each lighting data. As for the main illumination light sources 21, the light intensity at the time when the while LEDs emit light is appropriately adjusted. As for the sub illumination light sources 22, the luminescent color can be adjusted simply and easily by using the full color LEDs.

Figure 2:
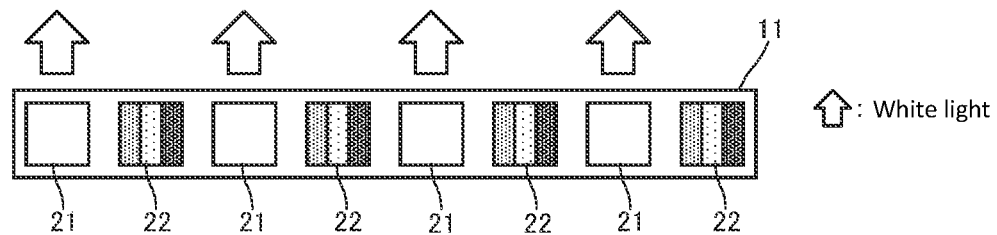
FIG. 2 is an explanatory diagram of a normal mode and a high illuminance mode in the illumination apparatus according to the embodiment of the present invention.
Figure 2:
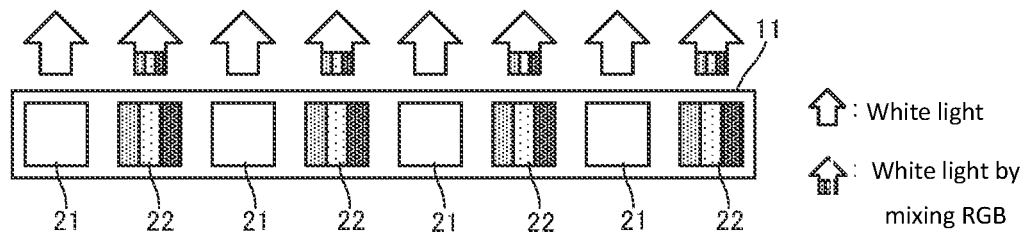

As the specific control by the control unit 30, for example, during normal use, as shown in FIG. 2(*a*), the illumination in the normal mode is performed by lighting only the white LEDs forming the main illumination light sources 21. The full color LEDs forming the sub illumination light sources 22 are not lighted at the time of this normal mode. Note that the lighting of the white LEDs in the normal mode does not necessarily need to be at 100% illuminance.

Additionally, according to various kinds of information such as the input of a control command, as shown in FIG. 2(*b*), the illumination in the high illuminance mode is performed by the control unit 30 in which, in addition to lighting of the white LEDs forming the main illumination light sources 21 during normal use, the full color LEDs forming the sub illumination light sources 22 are lighted in white as the main illumination light sources 21. Note that, although the lighting of the white LEDs in the high illuminance mode is basically at 100% illuminance, it may be appropriately adjusted.

According to the high illuminance mode, the full color LEDs of the sub illumination light sources 22, which are originally prepared, can be utilized. That is, without increasing the driving current for the individual white LEDs of the main illumination light sources 21, the illuminance in a cabin can be raised by increasing the irradiation light quantity in the same luminescent color as that of the normal mode. Such high illuminance mode may be, for example, an alarm at the time when a train arrives at a station, etc., or may be set at the time when the train passes a tunnel, etc.

Additionally, when a failure such as disconnection of the white LEDs forming the main illumination light sources 21, etc. occurs, all the white LEDs of the main illumination light sources 21 are no longer lighted in each substrate 11 (unit). The failure such as disconnection is detected by the control unit 30 at the occurrence of such an abnormality. Based on the detection result, as shown in FIG. 3, the illumination in the backup mode is performed by the control unit 30 in which the full color LEDs forming the sub illumination light sources 22 are lighted in the same white as the white LEDs of the main illumination light sources 21.

According to the backup mode, even when the white LEDs of the main illumination light sources 21 are no longer lighted due to a failure such as disconnection, it is possible to prevent complete lights out, since the full color LEDs of the sub illumination light sources 22 perform the function as backup lights by being temporarily lighted. Here, by lighting the full color LEDs in white, it is possible to continue the illumination that does not look different from the illumination during normal use. Note that, although the illuminance of the full color LEDs can be arbitrarily adjusted, the illuminance of the full color LEDs may be set to such an extent that can ensure required brightness.

Alternatively, in an emergency at the time of a disaster, the sub illumination light sources 22 may also be controlled to perform the function as a warning emergency light by lighting the sub illumination light sources 22 in another color, such as red light, which is different from the luminescent color of the main illumination light sources 21. Note that the detection of fire, etc. and the determination of a failure, such as disconnection in which the main illumination light sources 21 are not lighted, may be based on a signal (control command) from the outside.

Figure 3:
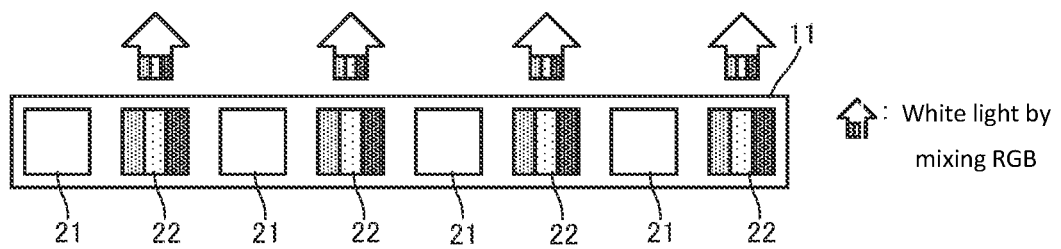
FIG. 3 is an explanatory diagram of a backup mode in the illumination apparatus according to the embodiment of the present invention.

Additionally, according to various kinds of information, such as the input of a control command, as shown in FIG. 3, the illumination in the dramatization mode is performed by the control unit 30 in which, in addition to lighting of the white LEDs forming the main illumination light sources 21, the full color LEDs forming the sub illumination light sources 22 are lighted in an arbitrary luminescent color. At this time, the lighting of the white LEDs does not necessarily need to be at 100% illuminance, and is a design matter that can be appropriately defined.

According to the dramatization mode, it can be changed to various color temperatures by using, as the base, the white color of the irradiated light of the main illumination light sources 21, and mixing the white color with the luminescent color arbitrarily adjusted by the sub illumination light sources 22. In this manner, according to the illumination apparatus 10, not only the illumination in the high illuminance mode and the backup mode, but also dramatic illumination, such as adjustment to a desired color temperature, can be easily performed, and the dramatization effects by illumination can be enhanced.

Figure 4:
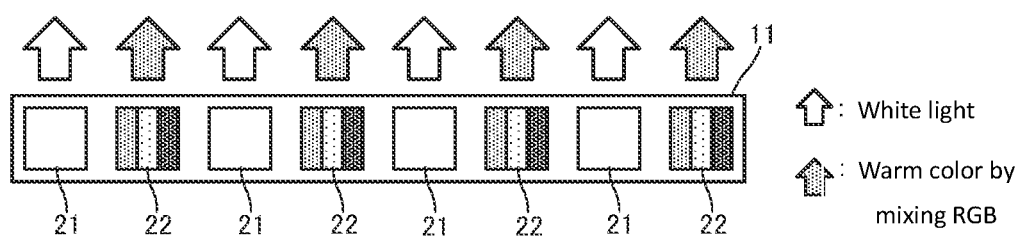
FIG. 4 is an explanatory diagram of dramatization modes in the illumination apparatus according to the embodiment of the present invention.
Figure 4:
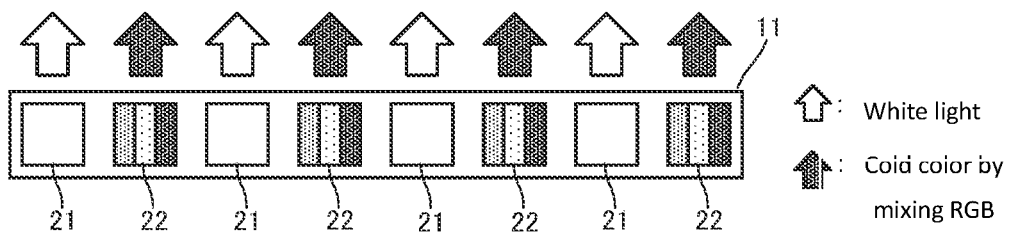

As a specific dramatization mode, for example, as shown in FIG. 4(a), the whole illumination can be adjusted to the color temperature of a warm color system by lighting the full color LEDs forming the sub illumination light sources 22 in the warm color system, in addition to the white light of the white LEDs forming the main illumination light sources 21. Accordingly, the atmosphere in a car can be changed by, for example, adjusting the color to a warm color system from fall to winter, or by adjusting the color to a warm color system depending on the time.

Additionally, as shown in FIG. 4(b), the whole illumination can be adjusted to the color temperature of a cold color system by lighting the full color LEDs forming the sub illumination light sources 22 in the cold color system, in addition to the white light of the white LEDs forming the main illumination light sources 21. Accordingly, the atmosphere in a car can be changed by, for example, adjusting the color to a cold color system from spring to summer, or by adjusting the color to a cold color system depending on the time.

<Configuration and Effects of Present Disclosure>

The present disclosure derived from the above-described present embodiment includes, in the illumination apparatus 10 including a plurality of light sources, the main illumination light sources 21 of a predetermined luminescent color, the sub illumination light sources 22 adjustable to an arbitrary luminescent color, and the control unit 30 that controls the lighting of the main illumination light sources 21 and the sub illumination light sources 22, the main illumination light sources 21 and the sub illumination light sources 22 are arranged in the state where the respective irradiated lights are mixed on the same path, and the control unit 30 can set the high illuminance mode in which, in addition to lighting of the main illumination light sources 21 during normal use, the sub illumination light sources 22 are lighted in the same luminescent color as the main illumination light sources 21.

According to the present disclosure as such, the adjustment of various color temperatures and illuminance as the whole illumination is enabled by mixing and combining the irradiated lights of the main illumination light sources 21 and the sub illumination light sources 22.

Particularly, the illumination in the high illuminance mode is enabled in which, in addition to lighting of the main illumination light sources 21 during normal use, the sub illumination light sources 22 are lighted in the same luminescent color as the main illumination light sources 21 by control of the control unit 30. Accordingly, the illuminance of the irradiation area can be raised by increasing the irradiation light quantity as the whole light sources.

Additionally, in the present disclosure, the control unit 30 can set the backup mode in which the sub illumination light sources 22 are lighted in the same luminescent color as the main illumination light sources 21 at the occurrence of an abnormality in which the main illumination light sources 21 are not lighted.

Accordingly, even when the main illumination light sources 21 are no longer lighted due to a failure such as disconnection, it is possible to prevent complete lights out, since the sub illumination light sources 22 perform the function as the backup lights by being temporarily lighted. Here, it is possible to continue the illumination that does not look different from the illumination during normal use, by lighting the sub illumination light sources 22 in the same luminescent color as the main illumination light sources 21.

Additionally, in the present disclosure, the control unit 30 can set the dramatization mode in which, in addition to lighting of the main illumination light sources 21, the sub illumination light sources 22 are lighted in an arbitrary luminescent color according to various kinds of information.

Accordingly, it can be changed to various color temperatures by using, as the base, a predetermined luminescent color of the main illumination light sources 21, and mixing the predetermined luminescent color with the luminescent color arbitrarily adjusted by the sub illumination light sources 22. Therefore, according to the illumination apparatus 10, not only the illumination during normal use and at the occurrence of an abnormality, but also dramatic illumination can be easily performed.

Additionally, in the present disclosure, the main illumination light sources 21 and the sub illumination light sources 22 are alternately arranged and disposed on the same straight line, respectively.

Accordingly, it becomes possible to evenly and substantially uniformly mix the irradiated lights of the main illumination light sources 21 and the sub illumination light sources 22 along a straight line, and especially, the irradiated lights can be utilized as line-shape illumination.

Additionally, in the present disclosure, the main illumination light sources 21 are the white LEDs that can emit light in a single color, and the sub illumination light sources 22 are the full color LEDs that can emit light in multiple colors by combining the three primary colors of light.

In this manner, since the main illumination light sources 21 and the sub illumination light sources 22 are formed by the LEDs, respectively, not only the lighting control is easy, but also miniaturization is possible, less power is consumed, and the lifespan is long. Especially, since the sub illumination light sources 22 use the full color LEDs, the luminescent color can be easily and freely adjusted.

Although the embodiment of the present invention has been described above with the drawings, the specific configuration is not limited to the embodiment as mentioned above, and modifications and additions in the range that does not depart from the gist of the present invention are also included in the present invention. For example, in the previously-described embodiment, although the example has been described in which the illumination apparatus 10 is applied to the interior light in a cabin of a railroad car, the illumination apparatus 10 is not limited to this, and can be applied to various illumination apparatuses.

Additionally, in the previously-described embodiment, although the switching of the illumination between the high illuminance mode and the dramatization mode is controlled according to various kinds of information, for example, the respective modes and the color temperature in the dramatization mode may also be configured to be appropriately switched by a manual operation via the operation unit connected to the control unit 30.

INDUSTRIAL APPLICABILITY

The present invention can be widely applied to, for example, illumination apparatus in various fields, as well as the interior light in a cabin of a railroad car, etc.

REFERENCE SIGNS LIST

10 . . . illumination apparatus
11 . . . substrate
12 . . . control substrate
21 . . . main illumination light sources 22 . . . sub illumination light sources
30 . . . control unit
40 . . . power supply unit

FIG. 1

10 ILLUMINATION APPARATUS
30 CONTROL UNIT
40 POWER SUPPLY UNIT
1 EXTERNAL POWER SUPPLY
2 CONTROL COMMAND
3 MAIN ILLUMINATION LIGHT SOURCE (WHITE LED)
4 SUB ILLUMINATION LIGHT SOURCE (FULL COLOR LED)

FIG. 2

(a) NORMAL MODE
(b) HIGH ILLUMINANCE MODE
1 WHITE LIGHT
2 WHITE LIGHT BY MIXING RGB

FIG. 3

1 BACKUP MODE
2 WHITE LIGHT BY MIXING RGB

FIG. 4

(a) DRAMATIZATION MODE . . . WARM COLOR
(b) DRAMATIZATION MODE . . . COLD COLOR
1 WHITE LIGHT
2 WARM COLOR BY MIXING RGB
3 COLD COLOR BY MIXING RGB

What is claimed is:

1. An illumination apparatus comprising:
a main illumination light source of a predetermined luminescent color;
a sub illumination light source adjustable to an arbitrary luminescent color; and
a control unit that controls lighting of the main illumination light source and the sub illumination light source,
wherein the main illumination light source and the sub illumination light source are arranged in a state where respective irradiated lights are mixed on the same path,
the control unit can set a high illuminance mode in which, in addition to lighting of the main illumination light source during normal use, the sub illumination light source is lighted in the same luminescent color as the main illumination light source, and
the control unit can set a backup mode in which the sub illumination light source is lighted in the same luminescent color as the main illumination light source at occurrence of an abnormality in which the main illumination light source is not lighted.

2. The illumination apparatus according to claim 1, wherein the control unit can set a dramatization mode in which, in addition to lighting of the main illumination light source, the sub illumination light source is lighted in an arbitrary luminescent color according to various kinds of information.

3. The illumination apparatus according to claim 1, wherein the main illumination light source and the sub illumination light source are alternately arranged and disposed on the same straight line, respectively.

4. The illumination apparatus according to claim 1, wherein the main illumination light source is a white LED that can emit light in a single color, and
the sub illumination light source is a full color LED that can emit light in multiple colors by combining three primary colors of light.

5. The illumination apparatus according to claim 1, wherein the control unit is configured to detect the abnormality when the main illumination light source is failed.

* * * * *